Oct. 15, 1935.  J. A. ANGLADA ET AL  2,017,198
CUFF VALVE ENGINE
Filed Oct. 17, 1931  5 Sheets-Sheet 1
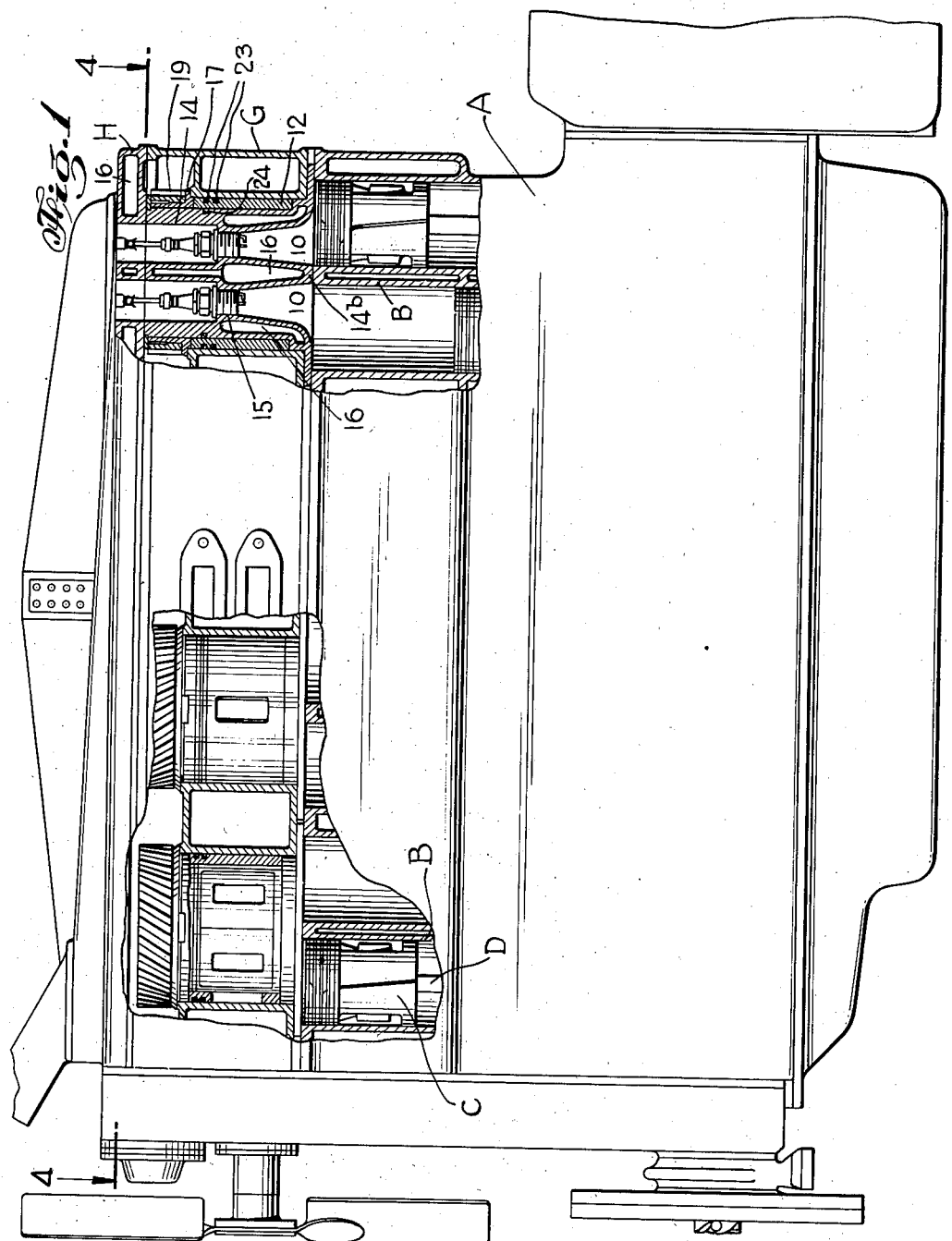
INVENTOR
JOSEPH A. ANGLADA
AXEL H. ASPROOTH
BY
ATTORNEYS Oct. 15, 1935.  J. A. ANGLADA ET AL  2,017,198
CUFF VALVE ENGINE
Filed Oct. 17, 1931  5 Sheets-Sheet 2
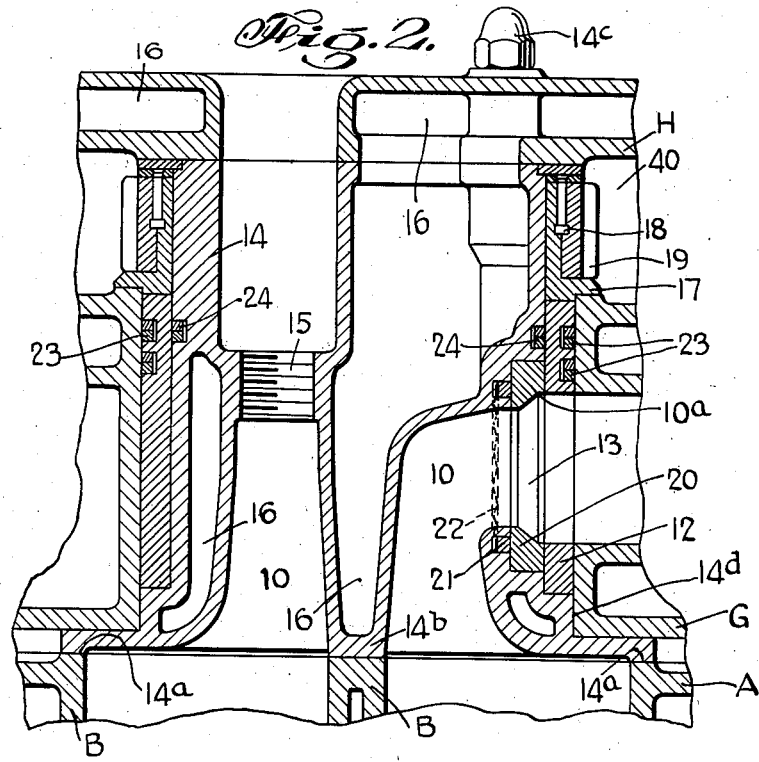
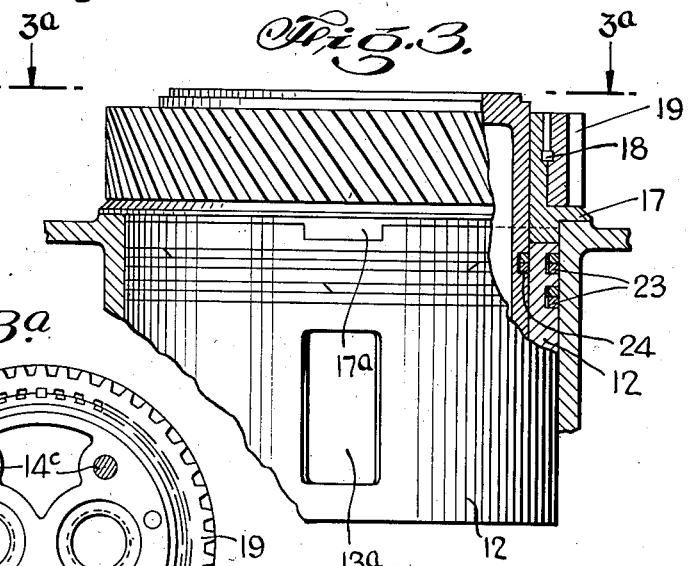
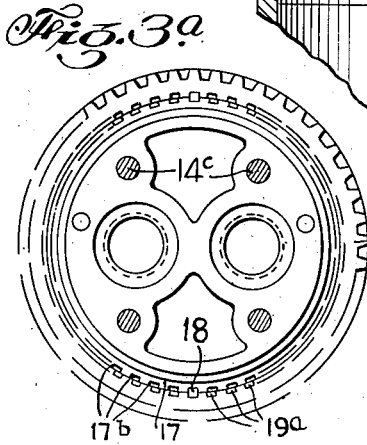
INVENTORS
JOSEPH A. ANGLADA
AXEL H. ASPROOTH
BY
ATTORNEYS

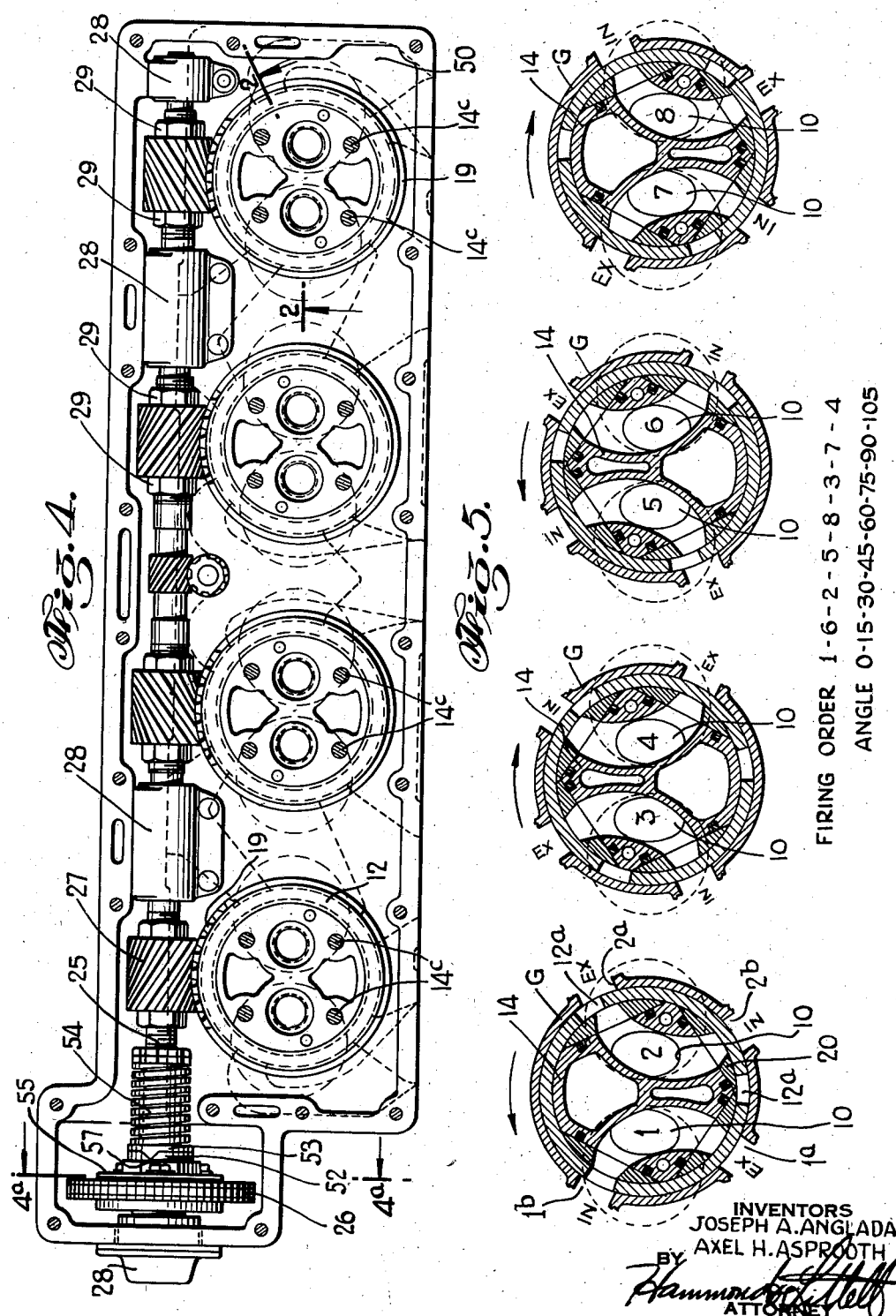

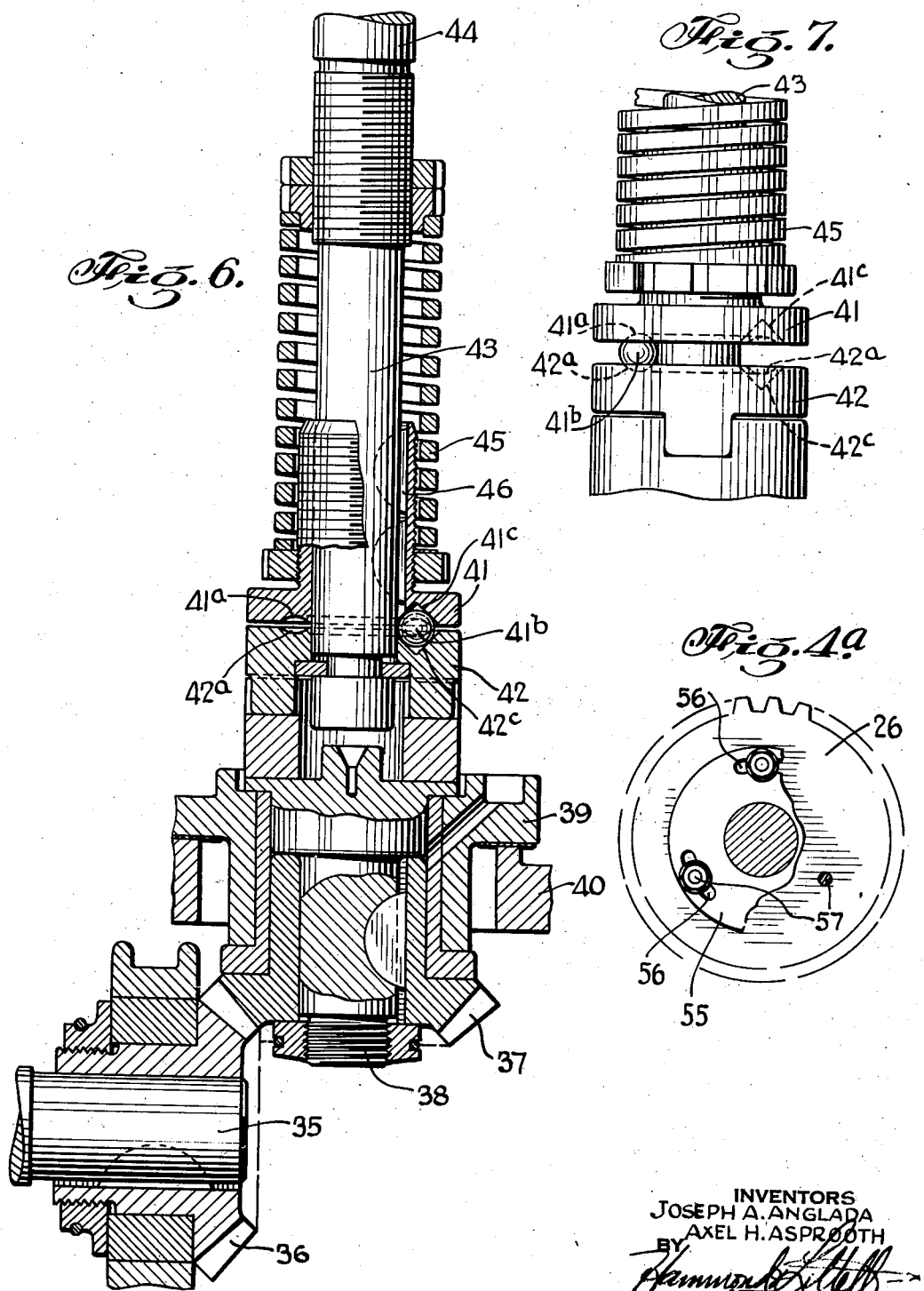

Oct. 15, 1935.　　　J. A. ANGLADA ET AL　　　2,017,198
CUFF VALVE ENGINE
Filed Oct. 17, 1931　　　5 Sheets-Sheet 5
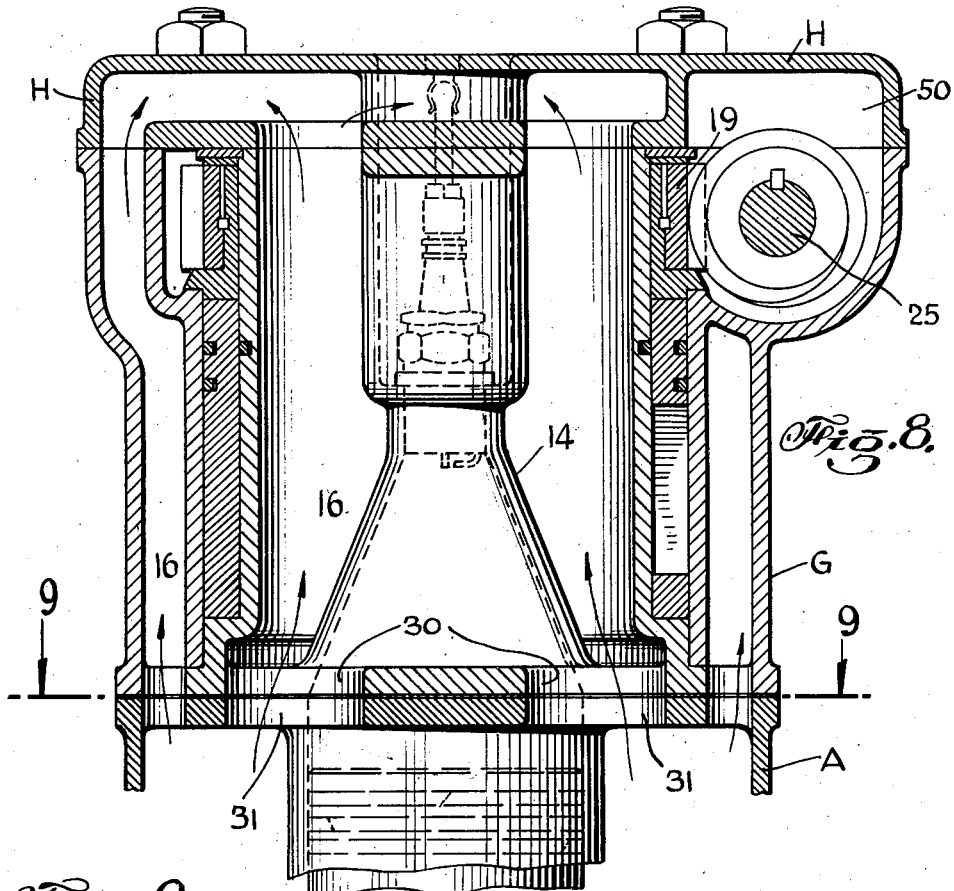
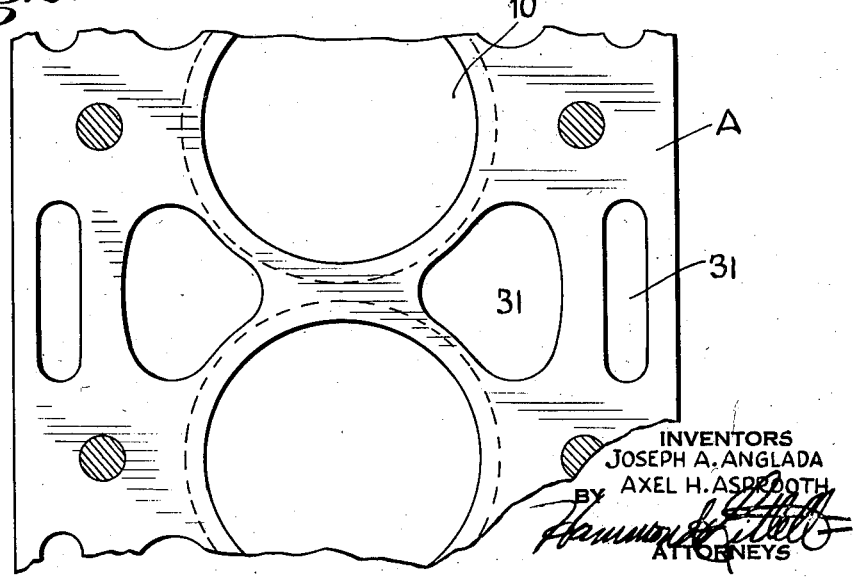
INVENTORS
JOSEPH A. ANGLADA
AXEL H. ASPROOTH
BY
ATTORNEYS Patented Oct. 15, 1935

2,017,198

UNITED STATES PATENT OFFICE 2,017,198

CUFF VALVE ENGINE

Joseph A. Anglada and Axel H. Asprooth, New York, N. Y., assignors to Anglada Motor Corporation, New York, N. Y., a corporation of Delaware Application October 17, 1931, Serial No. 569,384

12 Claims. (Cl. 123—80)

This invention relates to improvements in internal combustion engines and particularly to improvements in sleeve valve type engines having cuff or sleeve valves for controlling the inlet and exhaust to the cylinders.

One of the objects of this invention is to provide a sleeve valve engine with a single cuff valve assembly for two or more cylinders so that the valve ports in one valve alternately open and close the valve ports in the two or more cylinder heads which it surrounds.

Another object of the invention is to provide an internal combustion engine of the rotary sleeve or cuff valve type in which the valves are mounted in a separate detachable valve head resting on the cylinder block.

Another object of this invention is to provide a safety release device for the valve driving means of a sleeve valve engine to automatically disconnect the crank shaft from the valve drive mechanism in the event of overload of the valve drive means due to sticking of valves, under friction or otherwise.

Another object of this invention is to provide a gear drive train for rotary cuff valves permitting the independent adjustment of the timing of each valve with relation to the crank shaft and to each other valve.

Another object of this invention is to provide a friction drive connection between the crank shaft and the valves permitting the phase relationship of the valves and crank shaft to be altered by small increments.

Another object of the invention is to construct the valve ports of the valve block out of radial alignment with the port in the cylinder head and sealing shoe to prevent whistling.

Another object of this invention is to provide a fluid cooled internal cylinder or combustion head in a rotary cuff valve engine in which the combustion chamber is completely cooled by free circulation of cooling medium between the cylinder block casting and the valve head casting.

A further object of this invention is to provide a multi-cylinder engine with a removable cylinder head and valve assembly in which a single valve functions for two or more cylinders surrounding a plurality of combustion chambers.

Further objects and advantages of this invention will appear from the following description thereof, taken in connection with the attached drawings which illustrate preferred forms of embodiment of the device and in which:

Figure 1 is a side elevation of a multi-cylinder engine with parts in detail showing the internal construction, Figure 2 is an enlarged vertical section through a part of the valve casing and taken substantially on the line 2—2 of Figure 4, Figure 3 is a part sectional view showing the valve driving member and valve sleeve in assembled relation, Figure 3a is a detail plan view taken on the line 3a—3a of Figure 3 and showing the keyed connection between the valve and drive gear, Figure 4 is a horizontal section substantially on the line 4—4 of Figure 1 showing the gear drive of the respective valve sleeves, and showing in outline the location of the respective cylinders, Figure 4a is a vertical sectional detail taken on the line 4a—4a of Figure 4 showing the adjustable coupling, Figure 5 is a diagrammatic view showing the timing of the engine, Figure 6 is an elevational view partly in section of a modified form of safety release for the valve drive, Figure 7 is an elevational view of a part of the safety release drive shown in Figure 6 in the released position, Figure 8 is a vertical section through the engine at right angles to Figure 2 and centrally between two cylinders showing the circulation of the cooling fluid through the head, and, Figure 9 is a horizontal view on the line 9—9 of Figure 8.

In the embodiment illustrated, the engine consists of the principal parts characteristic of internal combustion engines including the crank case, a cylinder block A which has a plurality of cylinders B in which pistons C are adapted to be reciprocated through the medium of the connecting rods D which are driven from a crank shaft (not shown). The removable valve block casing G carries an embodiment of the improved cylinder head construction in which a single sleeve or cuff valve surrounds and controls the port openings into two combustion chambers located in the single head serving twin cylinders. The improved valve driving mechanism is also carried in the valve block casing G, and this valve block casing has a valve cover H, as will be hereinafter described. It will be understood however that this embodiment is merely illustrative of the invention and that one valve might be used to control three, four or more cylinders and that other forms of valve driving mechanism could also be used.

The engine chosen for illustration of the invention is provided with eight cylinders, 1, 2, 3, 4, 5, 6, 7, and 8, each cylinder of which has a separate combustion chamber 10, and each pair of combustion chambers 10 is provided with a single rotary valve 12, which is adapted to alternately open and close the valve ports 13 into the combustion chambers of two cylinders. As particularly shown in Figure 2, the double cylinder head 14 is sealed against the cylinder block A by the valve block G and the cylinder head 14 is provided with a surface 14a—14b engaging a similar surface common to the adjacent cylinders so as to form a sealed joint between these two surfaces.

The cylinder heads 14 are accurately fitted to the valve block casing G at 14d so as to maintain the casing alignment of the head in the valve block casing. The cylinder head 14 is provided with two substantially frustro-conical combustion chambers 10 each having suitable sparkplug or oil fuel injector receiving apertures 15.

The portion 14d centers and maintains the spacing of the bottom of the head 14 in the valve block G and the stud bolts 14c projecting through the valve block cover 4 assist in holding the heads 14 in position.

The valve sleeve 12 is a short open-ended cylinder or cuff valve which is driven by a detachable coupling member 17 having projections 17a fitting into openings in the valve sleeve. The coupling member 17 is further provided with external slots or keyways 17b which co-act with the internal teeth or keyways 18a on the gear 19 through the keys 18. Preferably, there are fifty keyways 19a and but forty-eight keyways 17b. Under such circumstances, there are always two pair of keyways in operative position to receive the keys 18. All other keyways are at a slight angle to each other and in order that the timing may be varied, it is merely necessary to remove the keys and replace them in other keyways which are in proper position after the timing is changed. The particular number of keyways provided in the illustrative example permit any valve timing change from one-twentieth of one degree to any angle which is a multiple thereof.

In order to prevent leakage between the valve ports 13 and the valve 12, slidable sealing shoes 20 are mounted between the cylinder head 14 and the valve 12 which shoes surround each of the ports 13 and are adapted to press against the rotating valve sleeve. The shoe 20 is segmental in shape and will have a central rectangular passage corresponding to the shape of the valve port openings 13a. An expanding ring 21 of the piston ring type is mounted in a recess in the combustion chamber head 14 behind the shoe 20 to prevent pressure leaks between the sealing shoe 20 and the head 14. A crinkle shaped or wavy spring 22 causes a lateral movement of the ring 21 to force the shoe 20 outwardly against the sleeve 12 thus maintaining a tight pressure seal between the shoes 20 and the sleeve 12, and between the head 14 and shoes 20 as described in our copending application, Serial No. 562,007, filed September 10, 1931.

As the shoe 20 is forced against the valve sleeve 12, it forms a slidable gas tight joint between the combustion chamber and the valve member. The expanding ring 21 seals the space between the shoe and the cylinder head, and the compression and explosion pressures in the combustion chambers 10 enters behind the shoe 20 and increases its pressure on the valve sleeve 12.

The ports in the sealing shoes 20 are of smaller area than the corresponding port openings in the valve block G. This will be particularly noted in Figure 5, and in operation the valve sleeve 12 will begin to open the port opening in the valve block before it reaches the opening side of the port in the valve sealing shoe. Such construction prevents the so called "whistling" effect which is very objectionable and which apparently is caused by the opening of a highly restricted area under exhaust conditions when the port is nearly closed. In the present construction, the outer port being already partly open before the sealing shoe port begins to open, as the ports are not in radial alignment, no resonant effect exists and whistling is eliminated.

The preferred form of valve drive is shown in Figure 4 in which the timing shaft 25 is driven from the crank shaft (not shown) in any desired manner through the gear 26.

The preferred manner of driving the timing shaft 25 is through a friction coupling as shown in partial detail in Figure 4a. The face of gear 26 is forced into contact with the clutch face 55 by means of bolts 57 mounted in slots 56. A series of bolts are used and they may be loosened for a partial rotation of the clutch face 55 with respect to the face of the gear 26, and as the clutch face member 55 is secured to the timing shaft 25, the relative timing of all of the valves may be changed as desired. This change may be as small as desired and usually will not be greater than the angular relation between the driving teeth for the gear 26. This gear may be either gear or chain driven from the crank shaft and material timing changes exceeding one tooth in angle will be made by shifting the gear teeth. The friction coupling will be used only in making vernier changes for all of the valves.

The timing shaft 25 is provided with helical gears 27 contacting with the cuff valve drive gears 19, suitable bearings 28 being provided to maintain the position of the shaft. The helical gears 27 may be splined or otherwise non-rotatably secured to the shaft 25. Suitable cooperating nuts 29 contact with respective faces of the helical gears 27, such nuts being screw threaded on the drive shaft 25. By loosening one of the adjacent nuts 29 with respect to any helical gear 27 and tightening the other cooperating nut, it will be possible to move that helical gear 27 longitudinally of the shaft 25. As the gears 27 are non-rotatably secured to the shaft 25, such movement will cause a rotational movement of the valve sleeve 12 due to the cooperation of the gear teeth on the helical gear 27 and the teeth on the valve driving gear 19. Such movement will cause a change of timing of the valve in sufficiently small increment to make precise timing possible. Further, each valve may be independently adjusted through the adjustable relation of the coupling member 17 and the gear 19.

The timing of the engine is diagrammatically illustrated in Figure 5. The valve block G is provided with a plurality of exhaust ports 1a and 2a and with a plurality of intake ports 1b and 2b respectively for each cylinder, the exhaust and intake ports 1a and 1b corresponding to one cylinder and the intake port 2a and exhaust port 2b corresponding to the second cylinder. The cylinder head 14 is shown to cover the combustion chambers 10 of cylinders 1 and 2, and the valve 12 operates for the first two cylinders and has three valve ports 12a, each of which is spaced 120° apart. It will be noted that sealing shoes 20 are provided for the ports in the head.

Any conventional sequence of intake and exhaust timing may be employed and in the timing arrangement illustrated the sequence is 1—6—2—5—8—3—7—4—1, and the angular spacing is 0°—15°—30°—45°—60°—75°—90°—105°—120°, and the angular spacing for the same event such as intake, compression, expansion and exhaust for successive cylinders is as follows; between cylinder 1 and the next in order or cylinder 6 is 15°, between 1 and the next following 6 which is 2, is 30°, and so on as indicated. It will be noted that during two revolutions of the crank shaft equal to 720° the valves have rotated 120° and have completed a four cycle sequence of events. The ports 12a in the rotary valves are spaced 120° apart and the valves are rotated at one-sixth crank shaft speed. The result is that the valve has little or no tendency to carbonize or to run hot and a more effective operation of the valve is possible.

As shown in Figure 9, the combustion spaces and valve chambers are cooled by circulating the cooling fluid such as water on all sides. The chamber 16 in the cylinder head 14 is fed by enlarged ports 30 in the head 14 which extend between each of the combustion chambers 10 and cooperate with the passages 31 into the cylinder block A. As shown by the arrows, the cooling medium circulates through the cylinder block A, through the valve block G, both inside and outside the sleeve 12 and through the valve block cover H, in a complete path or circuit. This construction is possible due to the arrangement of the valve head for each two cylinders which provides space for the conduits 30, between the combustion chambers 10.

A form of safety release mechanism for the valve drive is shown in Figures 6 and 7, which construction is particularly adapted for a chain drive valve mechanism. The valves are driven from the crank shaft 35 through suitable bevel gears 36 and 37, which drive the vertical power shaft 38. A clutch member 41 cooperates with a second clutch member 42, the clutch member 41 being secured to the drive shaft 43 which operates the valve drive mechanism (not shown), from the head 44. A spring 45 urges the clutch member 41 toward the adjacent clutch member 42. The clutch member 42 is provided with a race 42a, and the clutch member 41 is provided with a cooperating race 41a cooperating with the projections 42a to afford space for the driving ball 41b.

The clutch members 41 and 42 also have a driving connection in cooperating depressions 41c and 42c respectively, such depressions receiving the ball 41b and driving through it. The usual and driving position of the members is shown in Figure 6.

If the torque on the driving head 44 should increase by reason of a valve member being insufficiently lubricated or otherwise retarded against rotation, the spring 45 will be compressed and will permit the clutch member 41 to ride up on the ball 41b as illustrated in Figure 7, to release the driving connection between the clutch members. The clutch member 41 may be provided with a suitable spline cooperating with keys 46 and will thus slide along the length of the shaft 43. This will stop the motor from running. When the cause of the excess load in the safety release has been removed, the clutch member 41 will again engage in driving position with reference to the clutch member 42 when the crank shaft is rotated, and the valve timing will be automatically restored. As it is desirable that timing be automatically restored after the trouble has been remedied, the clutch members are each provided with only one depression which cooperates with the single ball and on rotation, the clutch members will be restored in only the one proper position.

For improved lubrication and cooling of the gear or chain driving mechanism as well as to protect from dirt and injury a chamber 50 is provided in the valve block G which is covered by the valve block cover H and this chamber surrounds the driving gears 19, on either the chain or gear drive as shown in Figures 4 and 9. This chamber may be provided with oil or other lubricant to maintain the parts cool and to prevent wear, and as a water circulation is maintained through the valve block G and cover H the lubricant may also be cooled. The chamber 50 also tends to reduce any noise or hum from the drive mechanism.

Figure 4 shows a modified form of safety release mechanism as applied to gear driven valve sleeves in which the driving gear 26 for the shaft 25, is driven from the crank shaft of the engine. The safety release comprises a clutch member 52 secured to the gear 26 and a cooperating clutch member 53 which is secured to the shaft 25 and is urged by a spring 54 into contact with the member 52. The operation of this form of device is substantially the same as that illustrated in Figures 6, 7, and 8. If too great a load is placed on the shaft 25, the shaft ceases to rotate and the spring 54 is compressed to permit the projections on the clutch member 53 to ride out of the depressions in the clutch member 52. When the obstruction is removed, however, the clutch members 52 and 53 will return to position without altering the valve timing.

The present valve construction is extremely simple due to the use of but a single valve sleeve for each two or more cylinders and by the reduction of the number of operating parts to a minimum so that an eight cylinder engine will thus have no more valve parts than the usual four cylinder sleeve valve engine. A low rotary speed of the valves is possible because of the multiplicity of ports and as they are adequately lubricated on the outside and inside and cooled on the inside and outside, the valves will have an extremely long life. There is no shock or other heavy loads on the valve mechanisms due to the uniform rotary motion of the valves.

The valves and heads are preferably ordinary castings which may be readily machined within broad commercial limits of accuracy and when assembled the heads and valves are accurately and easily timed and no fluctuating relation between the valves and the crank shaft is normally possible due to the light loads, adequate bearing surface and copious lubrication there is no wear to effect the timing, after it is established when the engine is initially assembled.

Complete cooling is possible due to the particular twin cylinder head construction for adjacent cylinders so that there are no dead pockets for steam generation. The timing arrangement is extremely simple and each valve does only a portion of the work necessary for other constructions, yet due to its long cooling period, it will be less subject to wear. The valve mechanism may be chain or gear driven as desired and in either case, the driving mechanism is readily lubricated and carried at the top of the piston stroke. Sealing shoes may also be used to prevent pressure loss and reduce friction loss without the necessity for extremely close fits between the valve and valve chamber.

The arrangement of the parts permits much larger port openings than is possible with other types of engines. High power with good economy is thus possible and as the entire construction is contained within a removable block thus permitting the use of a simple cylinder block which has no cavities, spouts or other parts for the accommodation of valves or their operating mechanisms. As the valve timing cannot change and as the valves are continuously and smoothly rotated within a closed chamber, the operation of the motor is smooth and silent at all operating speeds.

While we have shown a preferred form of embodiment of our device, we are aware that other modifications may be made therein within the scope and spirit of this invention and we therefore desire that our description herein and the claims appended hereinafter be considered illustrative of the extent and not as limiting the scope of the invention.

We claim:

1. In a multiple cylinder internal combustion engine of the class described a casing for intake and exhaust ports, a head secured in the casing, said head having intake and exhaust ports, the ports in said head having edges out of alignment with the ports in the casing, and a ported valve operating between the head and the casing to control the passage of fluid through ports in the casing and the head.

2. In a sleeve valve internal combustion engine of the class described a casing having intake and exhaust ports therein, a cylinder head having cooperating intake and exhaust ports, a valve sleeve controlling the admission and exhaust of gas through said ports in said head and casing, the valve ports in said casing being out of line with the edges of the valve ports in said head to prevent whistling.

3. A rotary sleeve valve internal combustion engine of the class described comprising a cylinder block, a plurality of cylinders in said block, a piston operating in each cylinder, means to reciprocate said pistons, and means to form a combustion chamber for each cylinder, including a valve block, a rotary sleeve valve within said block, a cylinder head within said valve and surrounded thereby, said valve having ports in the side walls thereof, said cylinder head and valve block having intake and exhaust conduits opened and closed by said valve, said cylinder head having a plurality of combustion chambers within a single valve, each of said chambers communicating with a different cylinder, means to rotate the valve to open and close said ports, and arcuate sealing means contacting with the interior of the valve to seal the respective ports against leakage therearound.

4. In an internal combustion engine of the class described a cylinder block, a plurality of cylinders therein, pistons carried within said cylinder, means to reciprocate said pistons, a valve block detachable from said cylinder block carrying valve mechanism and forming combustion chambers with said cylinders, said valve block having a plurality of cylinder heads suspended therefrom, each of said cylinder heads having a plurality of combustion chambers therein, each combustion chamber communicating with a different cylinder, said valve mechanism including a sleeve valve mounted between the cylinder heads and the valve block and including driving and timing mechanism, said valve block having a plurality of water conduits, water cooling the inside and outside of said valve and water cooling between said combustion chambers, said valve, valve block and cylinder heads having ports therein, the rotation of said valve controlling the intake and exhaust of a plurality of cylinders.

5. In an internal combustion engine of the class described having a cylinder block, a plurality of cylinders and a cylinder head member, a plurality of recesses in said member forming separate combustion chambers with different cylinders when the cylinder head is secured to a cylinder block, said recesses having a plurality of ports therein adapted to communicate with intake and exhaust manifolds, a valve mechanism controlling said ports including a cylindrical valve surrounding the combustion chambers and having ports therein, said valve being supported within the cylinder head member, and driving means for operating the valve to control the inlet and outlet to said cylinders, said valve having a small and continuously self-cleaning surface exposed to combustion gases.

6. In a multi-cylinder internal combustion engine of the class described, a common cylinder head for a plurality of cylinders, a reduced volume combustion chamber for each cylinder contained in said common cylinder head, a rotary cuff valve surrounding the common cylinder head and movable relative thereto, an inlet and exhaust opening into each combustion chamber, said cuff valve having ports therein, certain of said ports controlling inlet and exhaust of spaced cylinders, and means to drive said valve in timed relation to the crank shaft, said valve being in intimate contact with water cooled surfaces on both sides and throughout the major part of its surface, and means to water cool the common cylinder head adjacent the respective combustion chambers.

7. In a multiple cylinder internal combustion engine in combination with a cylinder head common to two or more cylinders and having recesses forming separate combustion chambers for each cylinder, a sleeve valve surrounding said head and controlling the gas passages to each of said cylinders, a housing serving to hold the head and valve in operating alignment, valve driving means to drive said valve, and a cylinder head cover having openings therethrough for the passage of cooling fluid, said cylinders being jacketed, said casing and head having additional openings and passages for the passage of cooling medium from the cylinder jacket to the cylinder head cover, said valve being in intimate contact with water cooled surfaces on both the inside and the outside thereof.

8. In a multiple cylinder sleeve valve internal combustion engine of the class described, a cylinder head common to two or more cylinders, recesses in the head forming separate combustion chambers, a valve surrounding said head, a casing surrounding said valve, and a cover adapted to enclose the head and the valve, said head and casing having passages therethrough for the circulation of a cooling medium said valve contacting with the cooled surfaces to control the temperature of the valve, said recesses being spaced from each other and forming water cooling conduits.

9. In an internal combustion engine, a cylinder block, having a plurality of aligned cylinders therein, a cylinder block cover, having a plurality of cylinder heads therein, each cylinder head having two combustion chambers, the said cylinder heads being positioned partly over one cylinder and partly over the adjacent cylinder with said combustion chambers each communicating with a separate but adjacent cylinder, inlet and outlet passages into said combustion chambers, and a rotary sleeve valve surrounding each cylinder head and combustion chamber, and means to rotate said valves to control the inlet and outlet of gases to said combustion chambers in timed relation to the operation of the engine, said sleeve valve being substantially out of contact with the combustion gases in the combustion chambers.

10. In a rotary cuff valve internal combustion engine having a plurality of cylinders, a removable valve block, a plurality of pistons mounted in said cylinders, a dual cylinder head forming combustion chambers for two separate cylinders, said head having a plurality of ports, each of said cylinder head ports communicating with a separate manifold for the introduction and discharge of gases to the individual combustion chambers, a valve of cylindrical shape mounted in said valve block, said valve being rotatable and having ports in the side walls thereof controlling the flow of gases into and out of said combustion chambers respectively, and means to rotate said valves, said valves being open-ended and of uniform diameters.

11. In an internal combustion engine, a cylinder block, a plurality of cylinders formed in said block, a plurality of cylinder heads fitted to said block, each cylinder head being provided with a pair of combustion chambers each having inlet and exhaust ports, the combustion chambers of each cylinder head serving adjacent cylinders in the block, a valve block secured to said cylinder block and having a plurality of rotatable sleeve valves disposed therein, each sleeve valve surrounding a cylinder head and serving to control the inlet and exhaust ports to the respective pairs of combustion chambers in said cylinder heads.

12. In an internal combustion engine, a plurality of cylinders arranged in pairs, a cylinder head for each pair of cylinders, having a pair of combustion chambers therein serving the respective cylinders of each pair, and an open ended sleeve valve surrounding each cylinder head and serving to control the admission of fuel to and the removal of exhaust gases from the pair of combustion chambers contained in the cylinder head which it surrounds.

JOSEPH A. ANGLADA.
AXEL H. ASPROOTH.

CERTIFICATE OF CORRECTION.

Patent No. 2,017,198.                                                            October 15, 1935.

JOSEPH A. ANGLADA, ET AL.

It is hereby certified that error appears in the printed specification of the above numbered patent requiring correction as follows: Page 1, first column, line 22, for "under" read undue; and that the said Letters Patent should be read with this correction therein that the same may conform to the record of the case in the Patent Office.

Signed and sealed this 10th day of December, A. D. 1935.

Leslie Frazer (Seal)                                             Acting Commissioner of Patents.